United States Patent [19]

Needham

[11] Patent Number: 4,658,268

[45] Date of Patent: Apr. 14, 1987

[54] HYDRAULIC SYSTEM FOR RECIRCULATING LIQUID

[75] Inventor: Alan Needham, Huntingdon, United Kingdom

[73] Assignee: Domino Printing Sciences Limited, Cambridge, United Kingdom

[21] Appl. No.: 662,536

[22] Filed: Oct. 19, 1984

[30] Foreign Application Priority Data

Oct. 19, 1983 [GB] United Kingdom ................. 8328000

[51] Int. Cl.[4] .......................... G01D 15/18; B05B 5/00

[52] U.S. Cl. ........................................ 346/1.1; 346/15; 346/140 R; 239/3; 239/708

[58] Field of Search ...................... 346/1.1, 75, 140 R; 230/3, 708

[56] References Cited

U.S. PATENT DOCUMENTS

| | | | |
|---|---|---|---|
| 4,067,020 | 1/1978 | Arway | 346/75 |
| 4,314,264 | 2/1982 | Bok et al. | 346/140 R |
| 4,320,407 | 3/1982 | Goldis et al. | 346/140 R |
| 4,399,446 | 8/1983 | McCann et al. | 346/140 R |
| 4,413,267 | 11/1983 | Hein | 346/75 |
| 4,422,085 | 12/1983 | Sumitomo et al. | 346/140 R |
| 4,460,904 | 7/1984 | Oszczakiewicz et al. | 346/75 |
| 4,464,668 | 8/1984 | Komai et al. | 346/75 |

*Primary Examiner*—E. A. Goldberg
*Assistant Examiner*—Gerald E. Preston
*Attorney, Agent, or Firm*—Lowe, Price, LeBlanc, Beck- & Shur

[57] ABSTRACT

A hydraulic system, suitably an ink supply system for an ink jet printer, wherein a first pump conveys ink under pressure from a reservoir to a work head and a gear pump returns unused liquid from a collector at the work head to the reservoir. A bleed line connects an outlet from the first pump to an inlet to the gear pump. Accordingly, there is a flow of liquid via the bleed line such that the gear pump applies sufficient suction to the collector to draw air or a mixture of air and unused liquid therefrom. The flow is also sufficient to ensure adequate lubrication of the gear pump. The first pump may also be a gear pump, in which case the two pumps are formed as a double-ended pump.

6 Claims, 3 Drawing Figures

HYDRAULIC SYSTEM FOR RECIRCULATING LIQUID

This invention relates to hydraulic systems, suitably to ink systems for ink jet printers.

In a continuous ink jet printer, ink is conveyed from a reservoir to a print head where the ink is forced through a nozzle at high pressure and broken up into droplets by an ultrasonic vibrator. Droplets emerging from the nozzle are charged by amounts which suit their print positions on a target and the charged droplets are then deflected on to the target by an electrostatic field. Uncharged droplets are returned to the reservoir.

It is preferable to employ gear pumps for pumping ink to and from the print head, since such pumps are robust, reliable and inert to chemical attack by components in the ink. Unfortunately, a large volume of air is mixed with the unused ink which is drawn back from the head on the suction side of the system. Accordingly, if a gear pump is used on the suction side there is an insufficient suction to withdraw unused ink. Moreover, there is generally an insufficient volume of ink to lubricate the gears, which become overheated and wear.

For this reason, a peristaltic pump is usually employed on the suction side of an ink jet printer. However, a peristaltic pump suffers from the disadvantage that non-volatile components in the ink are deposited in a flexible tube along which ink is forced in travelling through the pump. Upon drying, the components solidify and crack and cause damage to the flexible tube. This makes it necessary to flush the tube out daily.

Similar problems in operating gear pumps occur on the suction side of the other hydraulic systems wherein a large volume of air or other gas is mixed with a liquid withdrawn from a work head.

According to the present invention a hydraulic system and method are carried out by a first pump for conveying liquid pressure from a reservoir to a work head, the work head having a collector for unused liquid through which air enters the system, and a gear pump having an inlet connected to the collector and to a bleed line from an outlet from the first pump, the flow of liquid to the gear pump via the bleed line being such that the gear pump applies sufficient suction to the collector to draw air or a mixture of air and unused liquid therefrom and the flow being sufficient to ensure adequate lubrication of the gear pump.

Suitably, the first pump may be arranged to convey liquid to a plurality of work heads and the inlet to the gear pump may be connected to the collector of each work head.

The gear pump may be of conventional, cavity plate or suction shoe design.

The first pump may also be a gear pump, in which case the two pumps may be formed as a double-ended pump comprising an electric motor having opposed output shafts connected to the rotary parts of respective pumps.

The invention will now be described, by way of example, with reference to the accompanying drawings, in which.

Figure 1:
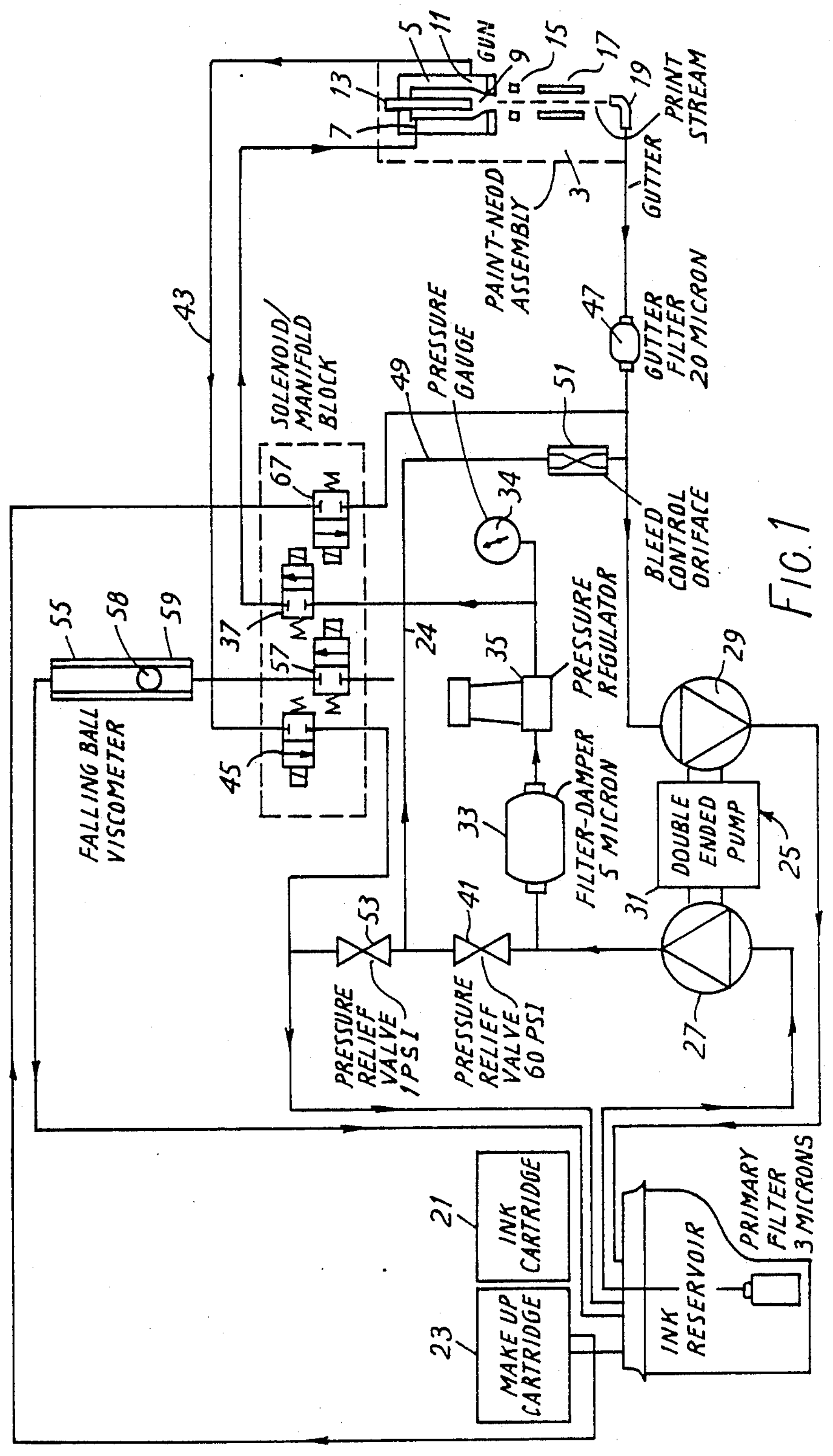
FIG. 1 is a schematic drawing of an ink jet printer including an ink system according to the invention.

Referring to FIG. 1 of the drawings, an ink system according to the invention is designed to convey ink between a reservoir 1 and a print head 3 of an ink jet printer. Included in the head 3 is an ink container 5 having an inlet 7 at an upper end thereof, an outlet orifice 9 at a lower end, and a bleed outlet 11. A vibrator 13, connected to a piezoelectric transducer (not shown), extends downwardly into the container 5. As hereinafter described, ink in the container 5 is subjected to a pressure which forces a jet of ink through the orifice 9. Vibration of the vibrator 13 ensures that the jet breaks up into droplets of uniform size. Below the container 5 there is an electrode 15 for charging droplets by an amount which suits their print positions on a target and a pair of electrodes 17 for deflecting charged droplets on to the target (not shown). The charge applied to each droplet, and hence the location at which it strikes the target, depends of course upon the instantaneous magnitude of the potential applied to the electrode 15. This potential is determined by an output from a print microprocessor (not shown). A gutter 19 is provided for collecting uncharged droplets, which are not deflected on to the target.

In the present system, the reservoir 1 is provided with a cartridge 21 containing ink for replenishing the ink stored within the reservoir. Also mounted on the reservoir 1 is a make-up cartridge 23 containing solvents for adding to ink within the system, as hereinafter described.

A double ended pump 25 serves to pump ink from the reservoir 1 to the print head 3 and to return unused ink from the head to the reservoir. The pump 25 includes a first gear pump 27, which is connected into the high pressure side of the system, and a second pump 29, which is on the suction side. Rotary parts of the pumps 27 and 29 are coupled to respective opposed shafts of a motor 31.

The pump 27, which is a gear pump of the suction shoe type, has an inlet connected to the reservoir 1 and an outlet connected to the head 3 via a filter damper 33, a pressure regulator 35 and a jet run solenoid valve 37. The filter damper 33 serves both to filter ink from the reservoir 1 and to dampen cyclical variations in the rate of flow of ink from the pump 27. The pressure regulator 35 maintains the pressure of ink supplied to the head 3 at a predetermined value. A visual indication of this pressure is provided by a pressure gauge 39. To ensure that the pressure of ink does not rise above 60 pounds per square inch, a pressure relief valve 41 connects the output of the pump 27 to the reservoir 1 by means hereinafter described.

A bleed line 43 is provided for returning a mixture of ink and air from the containers of the head 3 to the reservoir 1 at the beginning of a printing operation. Connected into the line 43 is a bleed solenoid valve 45.

On the suction side of the system, the pump 29 has an inlet connected to the gutter 19 via a gutter filter 47 and an outlet connected directly to the reservoir 1. The pump 29 is a gear pump of the cavity plate type.

To ensure that the pump 29 applies sufficient suction to the head 3 and is adequately lubricated, the inlet to the pump is connected to the outlet of the pump 27 via a bleed line 49 and the pressure relief valve 41. Included in the line 49 is a bleed control orifice 51 which is preset to allow a predetermined flow of ink to the pump 29.

The junction between the bleed line 49 and the valve 41 is connected to the reservoir 1 by a further pressure relief valve 53, which opens if the pressure of ink in the line 49 exceeds 1 pound per square inch.

Operation of the motor 31 and the valves 37 and 45 is controlled by a main microprocessor (not shown) which is linked to the print microprocessor.

In use of the present system, it is important to replace volatile solvents lost from the ink by evaporation in the head 3. Such loss of solvents is detected by detecting changes in the viscosity of the ink, which varies with changes in composition. Means are then provided for adding fresh solvents as necessary.

Figure 2:
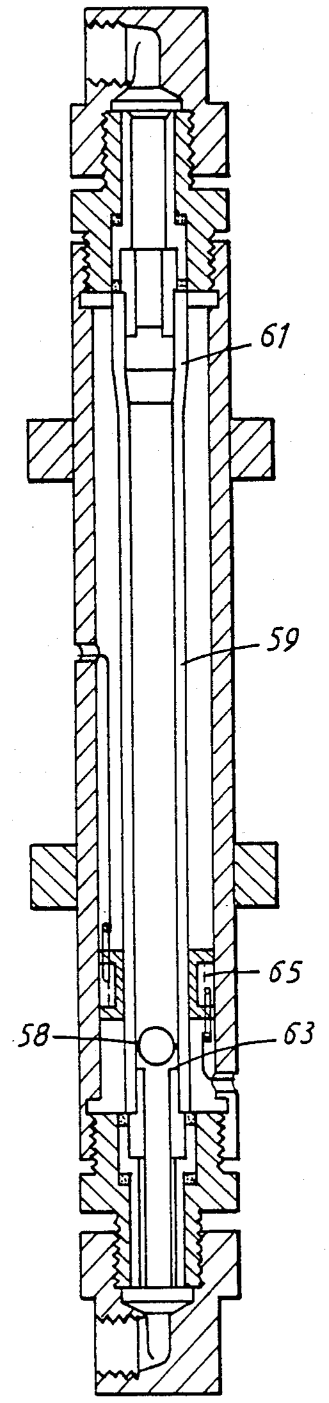
FIG. 2 is a viscometer included in the system of FIG. 1.

Referring now to FIGS. 1 and 2, a viscometer 55 has its inlet connected to the bleed line 49 by a normally closed solenoid valve 57 and its outlet directly connected to the reservoir 1. The viscometer 55 includes a stainless steel ball 57 which is movable upwardly and downwardly within an upstanding tube 59 of ground glass. At an upper end of the tube 59 there is a flared portion 61, whilst a seat 63 for the ball 57 is provided near to a lower end of the tube. A ball detector coil 65 surrounds a section of the tube 59 immediately above the seat 63.

The ink make up cartridge 23, referred to above, contains solvents which are added to the ink when a loss of solvents is detected by the viscometer 55. Solvents from the cartridge 23 are supplied to the line between the pump 29 and the gutter 19 via a normally closed make-up solenoid valve 67.

Figure 3:
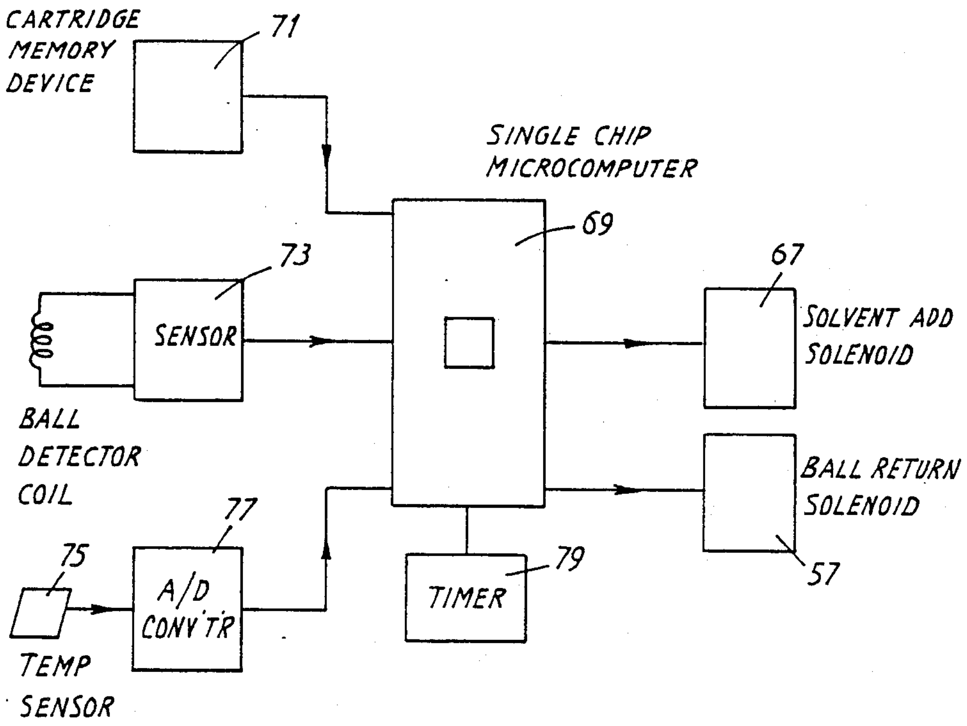
FIG. 3 is a block diagram of an electrical control circuit associated with the viscometer in the system of FIG. 1.

Associated with the viscometer 55 and the valve 67 is an electrical control circuit, shown in FIG. 3 of the drawings.

The control circuit of FIG. 3 includes a single chip microcomputer 69 having inputs which are supplied with data representing the current and desired viscosities of ink in the system and outputs which supply control signals for removing any discrepancy between current and desired viscosities. Thus, a first input to the microcomputer 69 is connected to a cartridge memory device 71 which stores data relating to various kinds of ink and the viscosities thereof for optimum printing results. A second input to the microcomputer is connected to a sensor 73, whose input is connected to the ball detector coil 65, referred to above. Further inputs are connected to a temperature sensor 75 and associated analogue/digital converter 77 and to a timer 79. Outputs from the microcomputer 69 are connected to the make-up solenoid valve 67 and to the solenoid valve 57, respectively.

The microcomputer 69 is programmed to activate the viscometer 55, to interpret data relating to viscosity and associated parameters applied to the inputs thereof, and to provide control signals for actuating the make-up solenoid valve 67, as hereinafter described.

In using the present system, the solenoid valves 57 and 67 are normally closed and the jet run solenoid valve 37 is normally open. Initially, the bleed solenoid valve 45 is also open.

Accordingly, when the motor 31 is first energised, ink from the reservoir 1 is pumped to the container 5 in the head 3 via the filter damper 33, the pressure regulator 35 and the jet run solenoid valve 37. The pressure applied to ink within the container 5 forces a jet of ink downwardly via the orifice 9 to the gutter 19. A mixture of ink and air is returned to the reservoir 1 via the bleed outlet 11 of the container 5, the bleed line 43 and the bleed solenoid valve 45. When all of the air has been exhausted from the container 5, the bleed solenoid valve 45 is closed.

Printing can now be commenced by energising the piezoelectric transducer so that the vibrator 13 causes the jet of ink from the orifice 7 to be broken up into droplets of uniform size and by energising the charging electrode 15 and the deflecting electrodes 17.

With the motor 31 energised, ink at an initial pressure of 1 p.s.i. is supplied from the outlet of the pump 27 to the inlet to the pump 29 via the pressure relief valve 41, the bleed line 49 and the bleed control orifice 51. This supply of ink seals internal clearances within the pump 29. Accordingly, the efficiency of the pump 29 as an air pump is increased, a higher suction is applied to the gutter 19, and a mixture of air and unused liquid is drawn from the gutter. As described above, the orifice 51 is pre-set to allow a predetermined flow of ink along the bleed line 49, this predetermined flow being sufficient to ensure that the pump 29 is adequately lubricated.

Once every 15 minutes during operation of the system, the microcomputer 69 initiates a check on the viscosity of ink in the system. As a first stage in the check, a signal from the microcomputer 69 is applied to the solenoid valve 57, causing the valve to open and to allow ink to flow from the bleed line 49 to the viscometer 55. Ink flows upwardly through the tube 59 of the viscometer 55, forcing the steel ball 58 upwardly into the flared portion 61 at the top of the tube. The ball remains in the flared portion 61, supported by the upwards flow of ink, whilst ink continues to flow upwardly past the ball and then outwardly from the tube 59 to the reservoir 1. The presence of the flared portion 61 means there is sufficient space for any solid particles in the ink to pass between the wall of the tube 59 and to return to the reservoir 1.

Approximately one minute after the solenoid valve 57 has been opened, the microcomputer 69 activates the timer 79 and at the same time applies a further signal to the valve 57, causing the valve to close. With the upwards flow of ink terminated, the ball 58 descends slowly within the tube 59 at a rate dependent upon the viscosity of ink in the tube. When the ball 58 has moved downwardly through a predetermined distance, it enters the ball detector coil 65. Movement of the ball 58 through the coil 65 is sensed by the sensor 73, which applies an input signal to the microcomputer 69.

Within the microcomputer 69, a computation of the viscosity of the ink is made from data representing the time between the closing of solenoid valve 57 and the arrival of the ball 58 at the coil 65, data representing the ambient temperature supplied by the temperature sensor 75 and the analogue digital converter 77, and data stored in the memory device 71 and representing the relationship between the viscosity of the ink, the time taken for the ball 58 to descend through the tube 59 and the ambient temperature.

A comparison is then made between the computed viscosity and data representing the optimum viscosity, also stored in the memory device 71.

Assuming there is a difference between the computed and optimum viscosities, an output signal is applied from the microcomputer 69 to the solenoid valve 67. The valve 67 is then opened for a predetermined interval of time and a predetermined volume of solvents flows from the make-up cartridge 23 to the line connecting the pump 29 to the gutter 19.

A similar computation of viscosity is made at intervals of 15 minutes. Each time there is a discrepancy between the computed and optimum viscosities, a fresh volume of solvents is supplied from the make-up cartridge 23. If the computed viscosity equals the optimum viscosity, the solenoid valve 67 remains closed so that no solvents are added.

I claim:

1. A hydraulic system comprising a first pump for conveying liquid under pressure from a reservoir to a work head, the work head having a collector for unused liquid through which air enters the system, a gear pump having an inlet connected to the collector, a bleed line connecting an outlet of the first pump to the inlet of the gear pump to provide a flow of liquid from the first pump to the gear pump via the bleed line while the first pump is conveying liquid to the work head, the flow of liquid via the bleed line being such that the gear pump applies sufficient suction to the collector to draw air or a mixture of air and unused liquid therefrom and the flow being sufficient to ensure adequate lubrication of the gear pump.

2. A system as claimed in claim 1, wherein the first pump is arranged to convey liquid to a plurality of work heads, and the inlet to the gear pump is connected to the collector of each work head.

3. A system as claimed in claim 1, wherein the gear pump is of cavity plate or suction shoe design.

4. A system as claimed in claim 1, wherein the first pump is a gear pump, the two pumps comprising an electric motor having opposed output shafts connected to rotary parts of respective pumps.

5. The system of claim 1, wherein said system is an ink jet printer and further comprising a print head, and an ink reservoir, the said system being connected between the print head to the reservoir.

6. A method of conveying liquid under pressure from a reservoir to a work head with a first pump, the work head having a collector for unused liquid through which air enters the system, and a second pump for returning air or a mixture of air and unused liquid to the reservoir, comprising the steps of:

(a) activating the first pump to operationally supply a first flow of liquid to said work head from said reservoir; and (b) supplying a second flow of liquid from said first pump to the inlet of said second pump being a gear pump so that the gear pump applies sufficient suction to the collector, said first and second flows being supplied simultaneously.

* * * * *